Patented Aug. 29, 1944

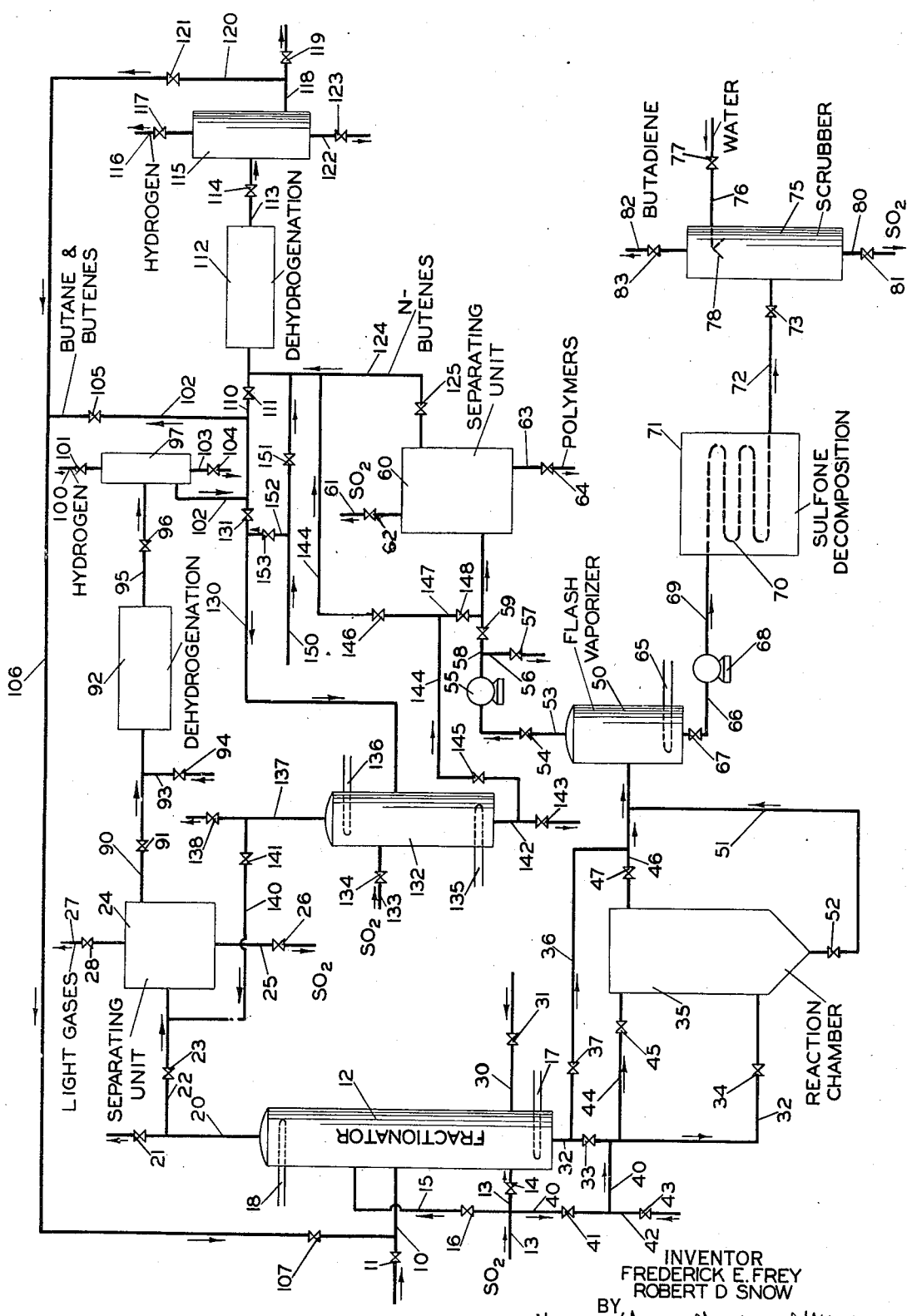

2,356,840

UNITED STATES PATENT OFFICE 2,356,840

CONCENTRATING DIOLEFINS

Frederick E. Frey and Robert D. Snow, Bartlesville, Okla., assignors to Phillips Petroleum Company, a corporation of Delaware Application April 1, 1941, Serial No. 386,324

4 Claims. (Cl. 260—681.5)

This invention relates to processes for obtaining conjugated diolefins in a concentrated form from hydrocarbon mixtures. It relates further to the concentration of low boiling diolefins, more particularly cyclopentediene, butadiene, and its lower boiling homologues, from mixtures containing other hydrocarbons of closely adjacent boiling points. As one modification, it relates to the production of a mixture of substantially normal $C_4$ hydrocarbons by the dehydrogenation of normal butane and/or normal butenes and the separation of a butadiene concentrate therefrom.

Diolefins are produced in a number of ways which include cracking of heavier oils, pyrolysis of gaseous hydrocarbons other than methane, the copolymerization of acetylene and ethylene to form butadiene, catalytic and thermal conversion of alcohols, both of the same number of carbon atoms per molecule as the desired diolefin and of a fewer number of carbon atoms per molecule, and other more or less involved chemical processes, as well as the dehydrogenation of the corresponding olefins which in turn may have been produced by the dehydrogenation of the corresponding paraffins. Although this latter procedure is one of the more direct ways of producing diolefins it has not yet found very extensive commercial application, and one of the obstacles in its commercial development has been the difficulty of effecting separation of olefins and diolefins from each other and from mixtures containing the corresponding paraffins.

Various processes have been proposed for the separation of conjugated diolefins by means of their reactions with sulfur dioxide. Badische Anilin Und Soda-Fabrik, Germany Pat. 236,386 (1911) disclosed the fact that conjugated diolefins react with gaseous sulfur dioxide or aqueous sulfurous acid at ordinary temperature to give mainly an insoluble, amorphous compound. They stated that when the amount of $SO_2$ present was small or the reaction time short, the product was partly soluble in water, and the soluble part crystallized in needle crystals which decomposed easily on heating to regenerate the diolefin and $SO_2$. They suggested this reaction as a means of separating diolefins.

Matthews and Strange, U. S. 1,196,259 (1916), disclosed a process for the purification of diolefins by reaction with sulfur dioxide in the presence of halogen-containing compounds which they claimed served to promote the formation of the crystalline material. The only temperature cited was 42° C. They considered this soluble, crystalline material, which decomposed at 120° C., to be a sulfoxide.

Staudinger, German 506,839 (1930), taught that the easily decomposed crystalline compound was a monomeric cyclic sulfone formed by 1-4 addition, and that the insoluble amorphous compound was a polymeric sulfone. He disclosed a process for the preparation of the crystalline monomeric sulfone in which the reaction of the diolefin with $SO_2$ was carried out at room temperature in the presence of anti-catalysts such as polyhydric phenols which inhibited the formation of the polysulfone.

Perkins (Canadian Patent 329,043 (1933) and U. S. 1,993,681 (1935)), disclosed a process for separating diolefins from hydrocarbon mixtures by heating the mixture with less than half its weight of sulfur dioxide for prolonged periods of time at about 100° C. The process described by Perkins may be continuous or stepwise with respect to the removal of the crystalline addition product and the return of the sulfur dioxide to the reactor, but is definitely a batch process with respect to the hydrocarbon mixture treated.

We have now found that conjugated diolefins may be separated from mixtures containing them by reacting with sulfur dioxide at 60–80° C., with or without materials such as isobutylene, and polyhydric phenols which inhibit the formation of the heteropolymeric sulfone addition product and with or without catalysts which promote the formation of the monomeric sulfone, the said process being continuous with respect to the flow of hydrocarbon and continuous or stepwise with respect to the separation of the diolefin-$SO_2$ addition product.

An object of this invention is to concentrate conjugated diolefins, particularly butadiene, by separation from other hydrocarbons of similar boiling temperatures in a continuous manner.

Another object is to produce a butadiene concentrate from mixtures of hydrocarbons containing relatively low concentrations of butadiene such as are produced by cracking or dehydrogenation.

Another object is to furnish a method by which a conjugated diolefin product, previously concentrated by some other process, can be further freed of diluent paraffin and olefin hydrocarbons and other undesirable impurities.

Another object is to separate a mixture of paraffin, monoolefin and diolefin hydrocarbons into three fractions consisting of the respective classes of hydrocarbons, each in concentrated form.

Another object is to combine methods for separating butadiene, butenes and butane from hydrocarbon mixtures with two-stage catalysts dehydrogenation with cycling of the butane and butenes to the first and second stages, respectively, of the dehydrogenation process in order to obtain high yields of butadiene from n-butane or a $C_4$ fraction.

Another object is to increase the concentration of butenes in the charge stock going to the second stage of a two-stage dehydrogenation process for producing butadiene from normal butane in order to improve the efficiency of the second stage.

Further objects will become evident to those skilled in the art as the description of the process proceeds.

It has been disclosed in U. S. Patent 2,186,524, of which we are co-inventors, that sulfur dioxide forms minimum-boiling azetropic mixtures with each of the butanes and butenes. In the copending application of Frederick E. Frey, Serial No. 383,235, filed March 13, 1941, it has been disclosed that butadiene may be separated from accompanying $C_4$ hydrocarbons by a limited azeotropic distillation in the presence of sulfur dioxide, with separation of a kettle product containing butadiene and 2-butenes, and substantially free of sulfur dioxide, the distillation being carried out so that there is a minimum of, or no, chemical reaction between sulfur dioxide and any unsaturated hydrocarbons present. We have now found that butadiene may be separated from such a kettle product by a process involving reacting the butadiene with sulfur dioxide to form a monomeric sulfone, particularly when this is done under novel conditions elsewhere herein more fully discussed. We have further found that in our present process the initial distillation in the presence of sulfur dioxide may be advantageously carried out under conditions such that a substantial portion, if not all, of the diolefin material present, such as butadiene, is reacted with sulfur dioxide to form a monomeric sulfone.

We have found that temperatures of 60–80° C. are sufficiently high to effectively suppress the formation of undesirable heteropolymeric sulfones of either the monoolefins or diolefins normally present and yet also sufficiently high to give a suitable reaction rate to the formation of the desirable monomeric sulfone. However, particularly when operating in the lower part of the temperature range, which is more favorable to the separation of paraffins by azeotropic distillation, we may use inhibitors of the branched chain olefin type such as isobutylene or unsymmethyl ethyl ethylene in amounts corresponding to 2 to 10 per cent or more of the total hydrocarbons present, or very small proportions of typical antioxidant inhibitors of the type of polyhydric phenols, etc., well known to those skilled in the art to prevent polymeric sulfone formation, and we may use a catalyst to accelerate monomeric sulfone formation. However, in most cases it is unnecessary to use catalysts or inhibitors in the specified temperature range.

In its simplest form the present invention comprises continuous feeding of a liquid hydrocarbon mixture with one-half to three times its weight of liquid sulfur dioxide into a reaction chamber maintained at 60–80° C., said reaction chamber being of such capacity as to allow time for completion of the reaction, and distilling the volatile matter from the stream emerging from the reactor at temperatures not exceeding 100° C. The sulfone addition product obtained as a residue may thereafter be decomposed by heating to 120–130° C. and $SO_2$ can then be extracted from the gaseous products by well known methods. This process is suitable for general application to the lower conjugated diolefins, especially butadiene, piperylene, isoprene, dimethylbutadiene, and cyclopentadiene.

Our invention will now be more specifically described in connection with the accompanying drawing which shows diagrammatically by way of a flow sheet an arrangement of apparatus for practicing our invention together with various modifications thereof. In connection with this drawing the invention will be described in various modifications for the productiton of butadiene. It will be appreciated that similar procedures may be followed to affect a production of other low boiling diolefins dicussed in this application.

Referring now to the drawing, a normal $C_4$ hydrocarbon material which contains butadiene, and which may be derived from any suitable source such as a fraction obtained from the gases resulting from the cracking of heavier oils or in the cracking of light gases to form normally gaseous olefins and/or low boiling diolefins, is charged through pipe 10 controlled by a valve 11 to suitable fractionation equipment illustrated by fractionating column 12. In fractionating column 12 a distillation of the $C_4$ hydrocarbons takes place in the presence of sulfur dioxide, which is added to the system through a pipe 13 and which may be introduced into a lower portion of the fractionating column 12 through valve 14 or which may be introduced entirely or in part at some suitable point above the point of introduction of $C_4$ hydrocarbons through pipe 10 by being passed from pipe 13 through pipe 15 controlled by valve 16. The fractionating column 12 contains suitable packing or bubble plates, not shown, to aid in fractionation and is suitably heated at the bottom by heating means illustrated by heating coil 17, and suitable and cooling reflux is obtained at the top by means such as is illustrated by the cooling coil 18. In one modification the fractionation is so conducted that substantially all of the unsaturated hydrocarbons are concentrated in the lower part, and only saturated hydrocarbons are removed in the overhead stream. Although the fractionating column can be operated over a fairly wide range of temperature, it has been found convenient to operate with a kettle temperature of about 80° C. and a head temperature of about 60° C. The amount of sulfur dioxide added to the fractionating column should be at least sufficient in quantity to form azeotropic mixtures with substantially all the paraffin hydrocarbons and to pass from fractionating column 12 with them as overhead low boiling fraction. As will be recognized by those skilled in the art the minimum sulfur dioxide requirement will vary with the composition of the hydrocarbon mixture introduced to the fractionating column and with the conditions under which the column is operated. When treating a $C_4$ hydrocarbon mixture the amount of sulfur dioxide will generally be of the order of 2 to 3 mols of sulfur dioxide per mol of butane plus isobutane, more specifically about 2.5 mols. In many instances we prefer to have a sufficient excess of sulfur dioxide over this amount to have an appreciable proportion thereof in the kettle product.

A low-boiling fraction comprising sulfur dioxide and butanes is removed from a top portion of a fractionating column 12 through pipe 20 and may be removed from the system through valve 21. In many instances, however, it will be desirable to subject this material to further treatment in the system, and for this purpose it is passed from pipe 20 through pipe 22 controlled by valve 23 to separating unit 24. This separating unit 24 will comprise suitable equipment for recovering a normal butane stream, a sulfur dioxide stream, and for removing and discharging from the system other materials which may be present in the low-boiling material passing through pipe 20 which are not desired in the system. Such separation equipment may consist of means for scrubbing the gases with water and recovery from the water of sulfur dioxide in a manner similar to that employed in the production of liquid sulfur dioxide, or it may comprise a refrigerating coil or vessel to cool the overhead mixture below a critical solution temperature together with a separator from which a light liquid layer may be removed to a fractionating column, and also from which a sulfur dioxide fraction may be recovered. The fractionating column can then be so operated that a substantially pure paraffin is removed as a kettle product and a paraffin-sulfur dioxide azeotrope is taken overhead and recycled to the aforesaid means for cooling and separation of liquid layers. In connection with such equipment the sulfur dioxide layer may if desired be passed to still another fractionating column, from which an azeotropic mixture is taken overhead and also recycled to the said cooling and separating means while sulfur dioxide is recovered in a fairly pure state as a kettle product.

A sulfur dioxide fraction may be removed from separating unit 24 through pipe 25 controlled by a valve 26. A portion of this material may be returned directly to the top part of fractionating column 12 as reflux by means not shown and/or to the fractionating column 12 through pipe 13. Undesired light gases may be removed from separating unit 24 and from the system through pipe 27 controlled by a valve 28.

The kettle product of fractionating column 12 will consist mainly of butenes, butadiene and/or a monomeric butadiene-sulfone, which latter may have been formed in the fractionating column, together with some excess sulfur dioxide. If the fractionating column 12 is so operated that substantial formation of this butadiene-sulfone takes place, it may be found desirable to have a small amount of an inhibitor present to prevent any substantial formation of heteropolymeric compounds of high molecular weight. When such inhibitors as isobutylene are not present in the material charged through pipe 10, or are not present in sufficient quantities, such inhibiting material may be added to fractionating column 12 through pipe 30 controlled by a valve 31; other inhibiting materials discussed herein may likewise be added in this manner as and when desired. The kettle product is removed from fractionating column 12 through pipe 32 controlled by valve 33, and when little or no butadiene-sulfone is contained therein, this material may be passed through valve 34 to a reaction chamber 35 wherein substantially all of the butadiene is converted to the monomeric sulfone. When sufficient sulfur dioxide is not present in this stream, additional quantities may be added from pipe 13 through pipe 40 controlled by a valve 41, which passes to pipe 32. When a butadiene-containing material is available which is not unduly diluted with butanes or the like, this material may be added directly to reaction chamber 35 through pipe 42 controlled by a valve 43, the material being passed through pipes 40 and 32 to reaction chamber 35, and in some instances such a fraction may constitute the sole charge to the process. The amount of sulfur dioxide added to reaction chamber 35 should be molecularly equivalent to the unreacted butadiene present plus an excess which may be 100 per cent or more in excess of that quantity. The reaction chamber 35 is of sufficient capacity to allow time for substantially complete reaction of butadienes with sulfur dioxide and is preferably maintained at a reaction temperature in the range of about 60° to 80° C. by a temperature controlling means not shown. The reaction chamber may be arranged so that the kettle product from the column enters at the bottom through pipe 32 as shown with the reaction mixture being withdrawn from the top through pipe 46 controlled by a valve 47 and passed to a flash vaporizer 50. In some instances it may be found more desirable to have the charge material enter at the top and the reaction effluent withdrawn entirely from the bottom in which case the material passing through pipe 32 is passed through pipe 44 controlled by a valve 45 leading to the top part of reaction chamber 35 and the reaction mixture will then be withdrawn from the bottom of the reaction chamber through pipe 51 controlled by valve 52 leading to pipe 46.

The operation of the fractionating column 12 is such as to permit concentration of butadiene and sulfur dioxide in the bottom portion and, as stated, a reaction between these materials to form a monomeric sulfone may be effected within this fractionating column. When this is done the separation of other materials from the butadiene is facilitated since the butadiene is being removed as such by chemical reaction, and the sulfone so produced can, therefore, be removed relatively free of unreacted butadiene which is maintained in the lower portion of the fractionating column and subsequently reacted. When such operating conditions are followed the material withdrawn through pipe 32 will contain very little unreacted butadiene and may be passed therefrom through pipe 36 controlled by a valve 37 directly to flash vaporizer 50 for subsequent treatment, with elimination from the system of the reaction chamber 35.

The flash vaporizer 50 is preferably operated under a low absolute pressure and at a small elevated temperature which should be substantially below the decomposition temperature of the butadiene-sulfone which is in the neighborhood of about 120° C. Unreacted material which will comprise primarily sulfur dioxide and butenes together with possible small amounts of butane are removed from flash vaporizer 50 through pipe 53 controlled by a valve 54 which leads to compressor 55. This compressor 55 serves to maintain a low absolute pressure within the flash vaporizer and to remove vapors and gases evolved therefrom as fast as they are released. These gases and vapors may be discharged from the system through pipe 56 controlled by a valve 57 or may be passed entirely or in part through pipe 58 controlled by valve 59 to a separating unit 60. This separating unit 60 will also comprise suitable equipment for effecting a separation of the materials charged thereto into any suitable or desirable fractions which will generally comprise at least a normal butene fraction and a sulfur dioxide fraction together with any heavy materials that may be present. Sulfur dioxide may be removed through a pipe 61 controlled by a valve 62, and undesired heavy materials may be removed through a pipe 63 controlled by a valve 64.

The butadiene-sulfone which will generally be present as a liquid under the preferred conditions discussed above is maintained at a somewhat elevated temperature below its decomposition temperature by suitable heating means represented by a heating coil 65 to free it of undesired gaseous material and is then passed through a pipe 66 controlled by valve 67 to a pump 68 and then through a pipe 69 to a heating coil 70 located in a suitable heat exchanger or furnace 71. In the heating coil 70 the butadiene-sulfone is heated to a decomposition temperature and maintained at this temperature which will generally be in the range of about 110° to 130° C., preferably about 120° C., for a period of time sufficient to effect substantially complete decomposition, but for a time so limited that only a minimum of secondary reactions take place. The products of this decomposition are passed from heating coil 70 through a pipe 72 controlled by a valve 73 to suitable separating means 75 illustrated by the scrubber shown. Sulfur dioxide is separated from butadiene by suitable means as by washing the gases with water introduced through pipe 76 controlled by valve 77 to a spray nozzle 78. A sulfur dioxide solution is removed from the lower part of the scrubber 75 through a pipe 80 controlled by a valve 81 and butadiene in a relatively pure state is removed as a gas through a pipe 82 controlled by a valve 83 and may be passed to suitable or further purification equipment as may be desired. Any decomposed butadiene-sulfone present in the material passing through pipe 72 may be removed from the separating means 75 and reintroduced to pipe 69 by means not shown.

While this part of our invention may be operated as described for the purification of butadiene obtained from any suitable source, this separation treatment is advantageously combined with one or more dehydrogenation steps for the production of butadiene from normal butane and/or from normal butenes and such a cooperative combination of process steps is to be considered a part of our invention. A normal butane fraction obtained from the material passing from the fractionating column 12 is removed from separating unit 24 through a pipe 90 controlled by a valve 91 and passed to a dehydrogenation unit 92. This material may be joined by normal butane secured from any suitable source and introduced to the system through pipe 93 controlled by a valve 94, and at times normal butane may be so introduced to our process as the sole charge. The effluent of the dehydrogenation is passed through a pipe 95 controlled by a valve 96 to separating means 97 which may be of a simple type to separate $C_3$ and lighter material from $C_4$ hydrocarbons. Hydrogen and other material lighter than $C_4$ hydrocarbons are removed from separator 97 through a pipe 100 controlled by a valve 101. $C_4$ hydrocarbons are removed through pipe 102. If any material heavier than $C_4$ hydrocarbons is present in the effluent of the dehydrogenation, this may be removed through pipe 103 controlled by a valve 104, but in many instances such a removal of heavier material will not be necessary. When the dehydrogenation in unit 92 is such that substantial amounts of butadiene are present in the effluent, the $C_4$ fraction may be passed through pipe 102 and valve 105 to pipe 106 and through valve 107 to pipe 10 and fractionating column 12 for treatment as has been discussed. When this modification is followed it may be desirable to operate fractionating column 12 so that a substantial portion of the butenes is contained in the material passing through pipe 20 and in the material passed through pipe 90. Such a single stage of dehydrogenation will be similar to that disclosed by Frederick E. Frey in his copending application Serial No. 354,890, filed August 30, 1940, or his hereinbefore mentioned application Serial No. 383,235, filed March 13, 1941. In many instances, however, it will be desirable to conduct the dehydrogenation unit 92 in a manner such as to produce optimum yields of butenes with little if any production of butadiene, with subsequent dehydrogenation of the normal butenes to butadiene in a second dehydrogenation step. When this is the case a $C_4$ fraction may be passed from pipe 102 through pipe 110 controlled by valve 111 to a second dehydrogenation unit 112 operated so as to produce from butenes charged thereto optimum yields of butadiene. The dehydrogenation effluent is passed from unit 112 through a pipe 113 controlled by a valve 114 to a suitable separator 115. Hydrogen and other material lighter than $C_4$ hydrocarbons are removed through pipe 116 controlled by valve 117. A $C_4$ fraction containing a substantial amount of butadiene is removed through pipe 118 and may be discharged from the system through valve 119. If desired this material may be introduced directly to reaction chamber 35 through pipe 42. This mixture may be treated in fractionating column 12 by being passed from 118 through pipe 120 controlled by valve 121 to pipes 106 and 10 and fractionating column 12 for treatment as has been discussed. Material higher boiling than $C_4$ hydrocarbons may be removed from separating means 115 through a pipe 122, controlled by valve 123.

As has been discussed the kettle product of fractionating column 12 will contain substantial amounts of normal butenes which will find their way to separating unit 60. These normal butenes may be recovered by means of separating unit 60 in a more or less concentrated form and may be passed therefrom through pipe 124 controlled by a valve 125 directly to the pipe 110 and the dehydrogenation unit 112. In some instances it may be desirable to have the normal butenes produced by the dehydrogenation unit 92 in a more concentrated condition before they are charged to the dehydrogenation unit 112. When this is the case the $C_4$ fraction passing through pipe 102 may be removed through pipe 130 controlled by a valve 131 and passed to suitable olefin concentration means represented by a fractional distillation column 132. Olefins may be separated from the paraffins in a more concentrated form in fractional distillation column 132 by distillation in the presence of sulfur dioxide in a manner disclosed in the previously mentioned Patent 2,186,524. Sulfur dioxide for this purpose may be introduced through a pipe 133 controlled by a valve 134. The fractionation may be aided by suitable packing or the like not shown, by heating means represented by heating coil 135, and by cooling and reflux means illustrated by cooling means 136. A paraffin-containing mixture is removed as a low boiling fraction through pipe 137 and may be discharged from the system through a valve 138 or may be passed entirely or in part from pipe 137 through pipe 140 controlled by a valve 141 to pipe 22 and separating unit 24. A higher boiling, olefin-containing fraction, which may or may not contain sulfur dioxide, is removed from fractionating column 132 through a pipe 142 and may be discharged through a valve 143 or may be passed, as will generally be the case, from pipe 142 through pipe 144 controlled by a valve 145. If this material is suitably free of sulfur dioxide, it may be passed on through pipe 144 and valve 146 directly to pipes 124 and 110 and dehydrogenation unit 112. In most cases, however, this material will contain an appreciable amount of sulfur dioxide, in which case it may be passed from pipe 144 through pipe 147 controlled by a valve 148 to pipe 58 and separating unit 60.

In some instances a hydrocarbon fraction containing appreciable amounts of normal butenes may be introduced to the system through pipe 150 controlled by a valve 151 and leading to pipe 124. When such a fraction contains substantial amounts of normal butane or the like which should be removed, the material may be passed from pipe 150 through pipe 152 controlled by a valve 153 leading to pipe 130 and olefin concentrating means 132. In some instances such a material may constitute the sole source of charge to our process.

The dehydrogenation unit 92 and the dehydrogenation unit 112 will be comprised of suitable heating units or furnaces, catalyst chambers, and the like, known to the art for effecting and maintaining catalytic, substantially non-destructive dehydrogenation of low boiling hydrocarbons. While it may be found possible to effect one or both of the dehydrogenations in the absence of a catalyst, we prefer to employ catalytic dehydrogenation for most of the charge stocks which will be introduced to our process, using any suitable dehydrogenation catalyst or catalysts. As is known, the catalyst chambers may be so arranged that heat is supplied to the catalyst body or bodies and to the reacting mixture to keep the reaction at a desired level. Stationary masses of granular catalysts may be used, or flowing masses of finely powdered solid catalysts may be employed, or other modifications of catalytic dehydrogenation may be employed as will be found most suitable. While the various fractional distillation units have been shown as single fractional distillation columns it is to be understood that this is merely diagrammatic and any of them may comprise two or more fractional distillation columns accompanied by conventional supplementary equipment as will be readily understood by one skilled in the art. Additional pumps, heaters, coolers, meters, flow controllers, temperature indicating and controlling equipment, reflux equipment, and the like, may be included and supplied by one skilled in the art in connection with any specific modification or installation in the light of the detailed discussions of material flows, reaction conditions, fractions desired, and material streams to be separated which are disclosed and discussed herein. Isobutane, and/or isobutene may be found to be present in one or more of the $C_4$ fractions being treated, or may be introduced purposely through pipe 30, as discussed. Such iso $C_4$ hydrocarbons can be removed through pipes 27, 100, 116, 61, and/or 63, as will be appreciated.

Other low-boiling diolefins can also be produced by our process, especially isoprene and cyclopentadiene. Piperylene is generally more readily separated from accompanying hydrocarbons, and its production will not require such elaborate treatment in most cases. While sulfur dioxide will react with $C_5$ diolefins to produce a diolefin-sulfone, it is not so well suited for use in connection with separating means 12 or 132. Therefore, when treating $C_5$ hydrocarbons to produce $C_5$ diolefins, other saturate-unsaturate separation steps known to the art should be substituted, the operation of reaction chamber 35 and immediately subsequent equipment remaining as described.

*Example I*

As an example of one method of practicing our invention, a normal butane fraction separated from natural gas is dehydrogenated in dehydrogenation unit 92, in admixture with a recycle normal butane fraction, at a low superatmospheric pressure and a temperature of about 1050° F. in the presence of a mass of granular dehydrogenation catalyst prepared by impregnating bauxite with chromium oxide, the flow rate being maintained between about 1 and 2 liquid volumes of butane per volume of catalyst per hour. The effluent, which contains a substantial quantity of butenes and a small amount of butadiene, is cooled and condensed to recover a $C_4$ fraction, which is passed from separating unit 97 to the fractionating column 12, wherein distillation takes place in the presence of added sulfur dioxide. A butane-sulfur dioxide fraction is removed as a low-boiling fraction and passed to separating unit 24, in which a normal butane fraction is recovered and passed to dehydrogenation unit 92 as the recycle normal butane fraction. A high-boiling, butenes-containing fraction is removed from fractionating column 12, and a normal butene fraction is recovered therefrom by employing reaction chamber 35, flash vaporizer 50, the separating unit 60. This normal butene fraction is dehydrogenated in dehydrogenation unit 112 in the presence of a granular catalyst which consists of bauxite treated with an alkali which leaves an alkaline residue, the dehydrogenation temperature being about 1200° F. Methane is added to maintain a total pressure slightly above atmospheric and an initial partial pressure of normal butenes of about 3 pounds per square inch absolute, and the flow rate is about 1.5 liquid volume of butenes per volume of catalyst per hour. By means of separating unit 115 a $C_4$ fraction, containing between 15 and 20 per cent butadiene, is separated from the dehydrogenation effluent and also passed to the fractionating column 12. The high-boiling, butenes-containing fraction removed from fractionating column 12 also contains the butadiene produced by the process. This fraction is passed through reaction chamber 35 at a temperature of about 70° C. in the presence of an excess of sulfur dioxide, the time being such that substantially complete conversion of the butadiene to the monomeric butadiene-sulfone is effected. The effluent is passed to the flash vaporizer 50, which is maintained at about 100° C. and a subatmospheric pressure. Vaporous material is removed by compressor 55 to separating unit 60, a normal butane fraction being recovered therefrom for subsequent treatment as has been described. The residual butadiene-sulfone is removed as a liquid from flash vaporizer 50 by pump 68, and is heated in coil 70 to about 120° C. to effect decomposition of the butadiene-sulfone, and butadiene is recovered in a substantially pure state through pipe 82 as a product of the process.

*Example II*

As a modification of the practice of the invention as in Example I, the dehydrogenation of normal butane is carried out at a temperature of about 950° F. in the presence of a granular chromium oxide gel, which contains about an equimolar amount of alumina and is prepared in the manner disclosed in U. S. Patent 2,098,959, the dehydrogenation effluent containing practically no butadiene. The C₄ fraction from the effluent of dehydrogenation unit 112, operated as in Example I, is not passed to fractionating column 12, but is removed through pipe 118 and valve 119, and introduced directly into reaction chamber 35 through pipes 42 and 44, along with the high-boiling fraction from column 12 and an excess of sulfur dioxide passed through pipe 40 and valve 41. The effluent of the reaction chamber 35 is passed through pipe 51 to flash vaporizer 50, and the remainder of the operation is as given in Example I.

*Example III*

As an example of another method of practicing our invention, a normal butane fraction is dehydrogenated in dehydrogenation unit 92 at a pressure of about 10 pounds per square inch gauge and a temperature of about 950° F., in the presence of a mass of granular chromium oxide gel, the flow rate being about two volumes of liquid butane per volume of catalyst per hour. The resulting C₄ fraction from separator 97 is passed to olefin concentration unit 132. A normal butane fraction is separated and returned to dehydrogenation unit 92, and a normal butene fraction, containing some normal butane, is separated and passed to dehydrogenation unit 112, wherein catalytic dehydrogenation takes place to produce butadiene. The resulting C₄ fraction is passed from separator 115 to fractionating column 12. Sulfur dioxide is added through valve 14, and a small amount of normal butane is removed in the low-boiling fraction, which is passed to separating unit 24. The fractionation column 12 is so operated that butadiene, concentrated in the kettle, is reacted with sulfur dioxide to form monomeric butadiene-sulfone. The high-boiling fraction, containing butenes and the butadiene-sulfone, is passed directly from the bottom of fractionation column 12 to flash vaporizer 50. Vapors are passed to separating unit 60, and a normal butene fraction is recovered and also passed to dehydrogenation unit 112. Butadiene is recovered from decomposition of the butadiene-sulfone.

It will be seen from these examples that our invention may be satisfactorily applied in several modifications. While these examples illustrate various preferred modes of operation, the limits so illustrated are not to be applied to limit unnecessarily the broader aspects of our invention. While the invention has been disclosed and discussed primarily in connection with continuous operation, intermittent operation of the invention, or of one or more parts of the combination process discussed, may at times be found advantageous and is not to be considered outside of the spirit of the disclosure and teachings. Production of other diolefins may be accomplished in similar operations.

The herein described process of effecting the reaction of the aliphatic conjugated diolefin content of the hydrocarbon mixture with sulfur dioxide to selectively convert the diolefin content to the monosulfone is claimed per se in our copending divisional application Serial No. 500,408, filed August 28, 1943.

We claim:

1. A continuous process for separating butadiene in the form of the monomeric sulfone from a C₄ hydrocarbon mixture containing butadiene, butane and butene which comprises continuously admixing with said mixture a quantity of sulfur dioxide in an amount sufficient to form an azeotropic mixture with all the butane in said mixture plus at least one mol of sulfur dioxide for each mol of butadiene in said mixture, continuously fractionally distilling and reacting the resultant admixture in a combined fractional distillation and reaction zone, maintaining said zone at a temperature within the range of 60 to 80° C., continuously withdrawing overhead from said zone a low boiling fraction consisting essentially of sulfur dioxide and substanitally all of said butane in azeotropic proportions, continuously withdrawing also from said zone a high-boiling bottom fraction comprising monomeric butadiene sulfone, substantially all of said butene and unreacted sulfur dioxide, and flashing said butene and unreacted sulfur dioxide from said bottom fraction at a temperature below the decomposition temperature of said sulfone to leave a residue of said sulfone.

2. A continuous process for the separation of butadiene in the form of the monomeric sulfone from a C₄ hydrocarbon mixture containing butadiene, butane and butene which comprises continuously admixing with said mixture a quantity of sulfur dioxide in an amount equal to between two and three mols for each mol of butane plus between one and two mols for each mol of butadiene in said mixture, continuously fractionally distilling and reacting the resulting mixture in a combined fractional distillation and reaction zone, maintaining said zone at a temperature within the range of 60 to 80° C., continuously withdrawing overhead from said zone a low boiling fraction consisting essentially of sulfur dioxide and substantially all of said butane in azeotropic proportions, continuously withdrawing also from said zone a high-boiling bottom fraction comprising monomeric butadiene sulfone, substantially all of said butene and unreacted sulfur dioxide, and flashing said butene and unreacted sulphur dioxide from said bottom fraction at a temperature below the decomposition temperature of said sulfone to leave a residue of said sulfone.

3. A process for the separation of butadiene in the form of the monomeric sulfone from a C₄ hydrocarbon mixture containing butadiene, butane and butene which comprises feeding said mixture continuously to a fractional distillation column and fractionally distilling and partially reacting same therein at a temperature of from 60 to 80° C. in the presence of sulfur dioxide in amount substantially in excess of that required to form an azeotropic mixture with the butane content of the feed, removing overhead from said column an azeotropic mixture of sulfur dioxide and substantially all the butane in the feed, removing from said column a kettle product consisting essentially of the butene and butadiene in the feed and excess sulfur dioxide over that required to form with said butane said azeotropic mixture, a part of said butadiene and sulfur dioxide in said kettle product having interacted in said column to form a monomeric butadiene sulfone, reacting the unreacted butadiene in said kettle product at a temperature of from 60 to 80° C. with an amount of sulfur dioxide in excess of the molecular equivalent of said unreacted butadiene while in the presence of said butene and said excess sulfur dioxide contained in said kettle product, and flashing the resulting mixture of butene, unreacted sulfur dioxide and monomeric butadiene sulfone at low pressure and at a moderately elevated temperature substantially below the decomposition temperature of said sulfone and thereby removing unreacted material comprising primarily sulfur dioxide and butene and leaving a residue of said sulfone.

4. A continuous process for the separation of butadiene in the form of the monomeric sulfone from a $C_4$ hydrocarbon mixture containing butadiene, butane and butene which comprises continuously fractionally distilling said $C_4$ mixture in the presence of sulfur dioxide in an amount substantially in excess of that required to form an azeotropic mixture with all the butane in said mixture in a fractional distillation zone, maintaining said zone at a temperature within the range of 60 to 80° C., continuously withdrawing overhead from said zone a low boiling fraction consisting essentially of sulfur dioxide and substantially all of said butane in azeotropic proportions, continuously withdrawing also from said zone a high boiling fraction comprising substantially all of said butadiene and butene and the balance of said sulfur dioxide, continuously reacting said high-boiling fraction in the presence of sulfur dioxide in excess of the molecular equivalent of the unreacted butadiene contained in said high-boiling fraction at a temperature of from 60 to 80° C. and thereby selectively converting the unreacted butadiene content thereof to monomeric butadiene sulfone, and continuously flashing from the reaction mixture the unreacted portion thereof comprising butene and unreacted sulfur dioxide at a temperature below the decomposition temperature of said sulfone to leave a residue of said sulfone.

FREDERICK E. FREY.
ROBERT D. SNOW.